(12) United States Patent
Bringer et al.

(10) Patent No.: US 8,670,562 B2
(45) Date of Patent: Mar. 11, 2014

(54) GENERATION AND USE OF A BIOMETRIC KEY

(75) Inventors: Julien Bringer, Paris (FR); Hervé Chabanne, Paris (FR); David Pointcheval, Thiais (FR); Sébastien Zimmer, Montrouge (FR)

(73) Assignees: Morpho, Paris (FR); Centre National de la Recherche Scientifique—CNRS, Paris (FR); Ecole Normale Superieure, Paris (FR)

( * ) Notice: Subject to any disclaimer, the term of this patent is extended or adjusted under 35 U.S.C. 154(b) by 541 days.

(21) Appl. No.: 12/809,331

(22) PCT Filed: Dec. 19, 2008

(86) PCT No.: PCT/EP2008/068122
§ 371 (c)(1),
(2), (4) Date: Jun. 18, 2010

(87) PCT Pub. No.: WO2009/083518
PCT Pub. Date: Jul. 9, 2009

(65) Prior Publication Data
US 2010/0310070 A1  Dec. 9, 2010

(30) Foreign Application Priority Data
Dec. 21, 2007  (FR) ..................................... 07 60311

(51) Int. Cl.
*G06F 21/00* (2013.01)
(52) U.S. Cl.
USPC ............... 380/44; 380/28; 713/182; 713/185; 713/186

(58) Field of Classification Search
USPC ...................... 713/182, 185, 186; 380/28, 44
See application file for complete search history.

(56) References Cited

U.S. PATENT DOCUMENTS

| 6,035,398 A * | 3/2000 | Bjorn ............................ 713/186 |
| 6,266,420 B1 * | 7/2001 | Langford et al. ............. 380/282 |
| 2003/0115475 A1 * | 6/2003 | Russo et al. ................. 713/186 |
| 2003/0126464 A1 * | 7/2003 | McDaniel et al. ............ 713/201 |
| 2003/0190046 A1 * | 10/2003 | Kamerman et al. .......... 380/286 |
| 2004/0054899 A1 * | 3/2004 | Balfanz et al. ................ 713/168 |
| 2006/0123241 A1 * | 6/2006 | Martinian et al. ............ 713/186 |

(Continued)

FOREIGN PATENT DOCUMENTS

| JP | 2005-293490 | 10/2005 |
| JP | 2006-277471 | 10/2006 |

OTHER PUBLICATIONS

International Search report from corresponding PCT Application No. PCT/EP2008/068122 Report Dated Apr. 15, 2009.

(Continued)

*Primary Examiner* — Chau Le
(74) *Attorney, Agent, or Firm* — Miller, Matthias & Hull LLP

(57) ABSTRACT

In a control system comprising control device adapted for, on the one hand, receiving signal indicating a first biometric datum (W), and, on the other hand, obtaining a second biometric datum captured (w'), at the level of the control device, the first and second biometric date are compared. Next, it is decided whether the first and second biometric data correspond on the basis of the comparison. Thereafter, at least a secret cryptographic key part (H(w)) is generated by applying cryptographic function to the first biometric datum.

8 Claims, 3 Drawing Sheets

(56) References Cited

U.S. PATENT DOCUMENTS

2006/0242407 A1* 10/2006 Kimmel et al. ............... 713/166
2007/0014400 A1* 1/2007 Wack et al. ..................... 380/44
2008/0209226 A1* 8/2008 Venkatesan et al. .......... 713/186
2008/0244276 A1* 10/2008 Prouff et al. .................. 713/193

OTHER PUBLICATIONS

Maltoni, Davide, et al., "Securing Fingerprint Systems", Springer Verlag, Jun. 2003, pp. 281-309, New York, US.

Boneh, Dan, et al., "Group Signatures with Verifier-Local Revocation", Proceedings of 11$^{th}$ ACM Conference on Communications and Security, CCS 04, Oct. 2004, pp. 168-177, Washington DC, US.

Jain, A. K., et al., "Biometric Cryptosystems: Issues and Challenges", Proceedings of the IEEE, Jun. 1, 2004, pp. 948-960, vol. 92, No. 6, IEEE, New York, US.

Hao, Feng, et al., "Combining Cryptography With Biometrics Effectively", Technical Report—University of Cambridge, Jul. 1, 2005, pp. 1-17, vol. 28, No. 640.

Zhou, Sujing, et al., "Shorter Verifier-Local Revocation Group Signatures from Bilinear Maps", Cryptology and Network Security Lecture Notes in Computer Science; LNCS, Jan. 1, 2006, pp. 126-143, vol. 4301, Springer Berlin Heidelberg.

Ding, Xuhua, et al., "Leak-free Group Signatures with Immediate Revocation", Distributed Computing Systems, Mar. 24, 2004, pp. 608-615.

Ateniese, Giuseppe, et al., "Quast-Efficient Revocation of Group Signatures", Financial Cryptography, Mar. 11, 2002, pp. 183-197, vol. 2357, Springer Berlin Heidelberg, Berlin.

Daugman, John, "How Iris Recognition Works", IEEE Transactions on Circuits and Systems for Video Technology, Jan. 2004, pp. 21-29, vol. 14, No. 1, IEEE.

Daugman, John, "High Confidence Visual Recognition of Persons by a Test of Statistical Independence", IEEE Transactions on Pattern Analysis and Machine Intelligence, Nov. 1993, pp. 1148-1161, vol. 15.

Maltoni, D., et al., "Handbook of Fingerprint Recognition", Apr. 2009, pp. x-xvi, Springer Verlag, Springer, London.

Maltoni, D., et al., "Fingerprint Scanners and Their Features", 2003, pp. 69-71, Springer Verlag, Springer, New York.

Wayman, J., et al., "Biometric Authentication: Technologies, Systems, Evaluations and Legal Issues", 2005, Springer Verlag.

* cited by examiner

GENERATION AND USE OF A BIOMETRIC KEY

CROSS-REFERENCE TO RELATED APPLICATIONS

This application is a U.S. national stage filing under 35 USC §371 of International Patent Application No. PCT/EP2008/068122 filed on Dec. 19, 2008, which claims priority under the Paris Convention to the French Patent Application No. 07 60311, filed on Dec. 21, 2007.

FIELD OF THE DISCLOSURE

This invention relates to the generation of cryptographic keys.

BACKGROUND OF THE DISCLOSURE

It is important that the secret keys used in cryptographic systems have characteristics which allow maintaining their secrecy.

Numerous methods are known for generating such secret keys for cryptographic use.

In particular, there is the random generation method as described in the document "Functionality classes and evaluation methodology for physical random number generators", reference AIS31 version 1 dated Sep. 25, 2001, BSI.

The invention aims to provide another type of generation of such secret keys.

SUMMARY OF THE DISCLOSURE

A first aspect of the invention proposes a control process in a control system comprising a control device adapted to receive a signal indicating a first biometric data item and to obtain a second captured biometric data item, said process comprising the following steps at the control device:

/a/ comparing the first and second biometric data items,

/b/ deciding that the first and second biometric data items correspond to each other on the basis of step /a/, and /c/ generating at least a portion of a secret cryptographic key by applying a cryptographic function to the first biometric data item.

Through these measures, it is advantageously possible to generate a cryptographic key offering a very high level of protection because it issues directly from a biometric data item of a person.

In addition, as there can be substantial differences between two separate acquisitions of biometric data captured from the same person, knowledge of numerous acquisitions of the same biometric data item does not allow determining the exact value of the biometric data item used as a reference, meaning the first biometric data item. Thus the variable character of capturing a biometric data item guarantees a high level of confidentiality of the key obtained according to an embodiment of the invention. As a result, the invention advantageously makes use of this variability in the biometric data.

The signal indicating the first biometric data item can come from a storage device on which the first biometric data item is stored. A person equipped with such a storage device on which the first biometric data item is stored can be verified according to a control process in accordance with an embodiment of the invention. It should be noted that the control device can be located at the storage device or it can be situated at a sensor which serves to capture the second biometric data item.

In one embodiment of the invention, a complete secret cryptographic key is generated in step /c/, and the cryptographic system can additionally comprise a database storing at least said secret cryptographic key, said process then additionally comprising the following steps at the control device:

/d/ sending a control request based on the secret cryptographic key, and

/e/ receiving a control response indicating whether the secret cryptographic key is stored in the database.

Thus the secret cryptographic key generated according to an embodiment of the invention can easily be applied in a context of verifying a person's identity. Such an identity control can correspond either to an authentication or to an identification of the person verified.

It should be noted that in such a control system, the database may only contain biometric data in hash form. Such a database, and therefore such a control system, offers a very high level of confidentiality of the biometric data.

The control is based on biometric data but only applies cryptographic mechanisms at the end during the comparison of the hashed biometric data item received from the control device and one of the biometric data items stored in hash form in the database.

In one embodiment of the invention, an advantageous application of the invention in the field of group signatures is provided. To do this, a group secret is associated with members of a group, each of the members being able to do a group signature;

said process additionally comprising the following steps at the control device:

/i/ receiving a message,

/ii/ signing the message on the basis of a secret cryptographic key comprising the secret cryptographic key portion generated in step /c/ and another secret cryptographic key portion which satisfies the following equation:

$$A = g_1^{1/K+\gamma}$$

where K is the secret cryptographic key portion generated in step /c/,

γ is the group secret, and $g_1$ is a public parameter of the control system,

/iii/ sending the signed message in response to step /i/.

Then in a later step /iv/, a response can be received indicating whether the signature is a valid signature of the group.

By associating a group secret with the signature group considered, and taking into account another secret key portion A based on both the secret key portion generated by the control device and on the group secret, a message or challenge can be signed which is sent during a control phase, which allows proving that the person who signed the message is a member of the group, because if he was able to sign in that manner it means he knows the complete secret key.

The control system can comprise a registration server, with said control process additionally comprising the following steps at the control device, before step /i/:

receiving the other secret cryptographic key portion from the registration server storing said other secret cryptographic key portion on a storage device.

Thus in one embodiment of the invention, the person who wants to sign in the name of a group can be verified beforehand to decide whether that person belongs to the group. To do this, during an enrollment phase the storage device for that person can receive the first biometric data item from the control device, which allows generating a first secret key portion, and a second secret key portion from the registration server. Implicitly having the complete cryptographic key formed from the first and second secret key portions (because the storage device has the biometric data item which allows generating the first secret key portion), the person equipped with his storage device is able to prove that he belongs to the signature group according to an embodiment of the invention.

A second aspect of the invention proposes a control process in a control system comprising a storage device adapted to store a first biometric data item, and a registration server; wherein a group secret is associated with members of a group, each of the members being able to do a group signature; said process comprising the following steps, at the registration server:

/a/ obtaining a first secret cryptographic key portion by applying a cryptographic function to the first biometric data item, /b/ generating a second secret cryptographic key portion A according to the following equation:

$$A = g_1^{1/K+\gamma}$$

where K is the first secret cryptographic key portion,
γ is the group secret, and
$g_1$ is a public parameter of the control system, /c/ transmitting the second secret cryptographic key portion towards the storage device.

Here, the registration server is adapted to generate a second secret key portion from a first secret key portion and a group secret, the first and second secret key portions forming a secret cryptographic key adapted to be used in a group signature mechanism according to an embodiment of the invention.

A third aspect of the invention proposes a control system adapted to implement a control process according to the first aspect of the invention.

Other features and advantages of the invention will be apparent from the following description of one of its embodiments.

BRIEF DESCRIPTION OF THE DRAWINGS

The invention will also be better understood by referring to the drawings, in which.

DETAILED DESCRIPTION OF THE DISCLOSURE

Figure 1:
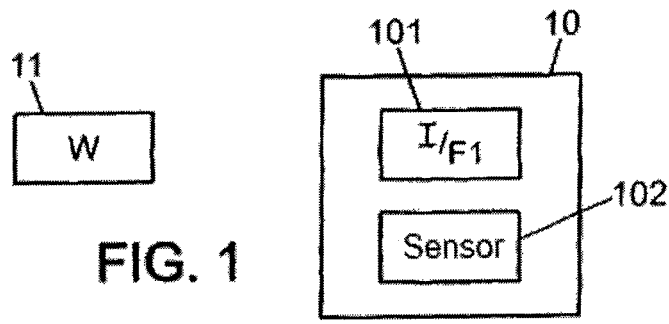
FIG. 1 illustrates at least a part of a control system according to one embodiment of the invention.

FIG. 1 illustrates at least a part of a cryptographic system according to one embodiment of the invention.

Such a system comprises a control device 10 adapted both to read at least a first biometric data item w which was previously stored on a storage device 11, and to capture a second biometric data item w'. No limitation is placed on the invention concerning the location of the different storage, control, and capture functions. The figures described below are only provided as illustrations of an embodiment.

This device comprises an interface unit 101 for receiving a signal from the storage device 11, indicating the stored biometric data item w, and a sensor 102 for capturing biometric data. This sensor can additionally be adapted to determine whether the user is living and avoid fraud concerning deceased or virtual people.

No limitation is placed on the type of biometric data which is manipulated in the context of the invention. For example, it can be biometric data concerning the iris, a fingerprint, or any other biometric data.

Figure 2:
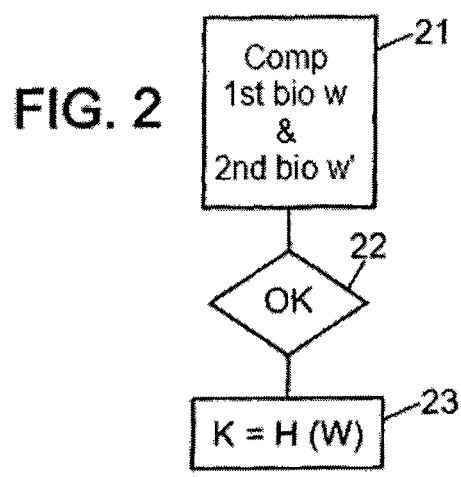
FIG. 2 illustrates the primary steps of a control process according to one embodiment of the invention.

FIG. 2 illustrates the main steps of a control process according to one embodiment of the invention, implemented at the control device 10.

In the context of the invention, a storage device 11 is used on which the first biometric data item w is stored. No limitation is placed on the invention concerning the type of storage device used. For example, this storage device can be a USB (Universal Serial Bus) key or a smart card, or can simply be in the form of a printed piece of paper (such as a bar code).

The control device 10 is adapted to retrieve this first biometric data item w from the storage device 11. It is also adapted to capture a second biometric data item w'. When it has the first and second biometric data items available to it, the control device makes a comparison between these first and second biometric data items, in a step 21. This comparison attempts to determine whether the first and second biometric data items come from the same person. In this step, one of the known methods for comparing biometric data can be used, such as the one described in the document "How iris recognition works" by J. Daugman, or "High Confidence Visual Recognition of Persons by a Test of Statistical Independence", 1993, IEEE Trans. on Pattern Analysis and Machine Intelligence, or in the document "Handbook of fingerprint recognition" by D. Maltoni, D. Maio, A. K. Jain, S. Prabhakar, or in the document "Biometric Authentication: Technologies, Systems, Evaluations and Legal Issues" by J. Wayman, A. Jain, D. Maltoni and D. Maio.

These examples are only provided as illustrations and in no way limit the executing of this step in the context of the invention.

When the comparison has determined that these first and second biometric data items come from the same person, the control device can then decide that these first and second biometric data items correspond to each other, in a step 22. In this case, the control device 10 generates a cryptographic key K in a step 23, by applying a cryptographic function H which can for example be a hash function, to the first biometric data item w. The following equation is satisfied:

$$K = H(w)$$

Such a cryptographic key K therefore issues directly from a biometric data item which belongs to a person. It should be noted that it is almost impossible to discover the key based on other captures of the same biometric data item, because of the significant variation between acquisitions. Advantageously, such a key K can be used in any cryptographic system.

In particular a control system can be established that verifies a person's identity on the basis of such a cryptographic key, or in other words an identification and/or authentication system.

Figure 3:
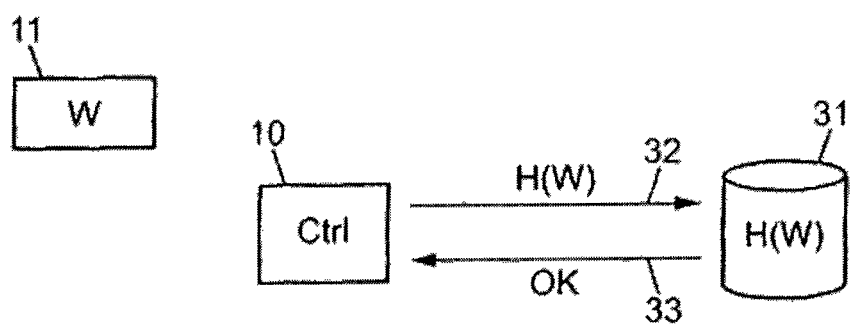
FIG. 3 illustrates an identification and/or authentication system according to one embodiment of the invention.

FIG. 3 illustrates such an application of the invention in a control system that verifies a person's identity.

Such an identification and/or authentication system, in one embodiment of the invention, comprises the control device 10 and a database 31 with which it is able to communicate. This communication between the control device 10 and the database 31 can be either a direct communication or a communication through an intermediate database management device, not illustrated, which can be directly interfacing with the control device, receiving its requests and sending it responses after having performed a database lookup, and directly interfacing with the database 31 in order to access the data stored in said database.

In such a control system, there can be an enrollment phase prior to any identity control phase. This enrollment phase is advantageously done in a confidential manner.

The application context of the invention in no way limits the implementation of such an enrollment phase. At the end of this enrollment phase, the database 31 contains hashed biometric data which respectively correspond to the biometric data w stored on storage devices according to an embodiment of the invention.

The hashed biometric data stored in the database are obtained by applying a cryptographic hash function H to the biometric data w stored on the storage devices 11.

Then, in a control phase for verifying a person who has a storage device 11 according to an embodiment of the invention, the control device 10 compares the first biometric data item w which is stored on said storage device 11 with a second biometric data item w' which it has just captured from the person being verified, via its sensor 102.

If the control device decides that these first and second biometric data items come from the same person, meaning the person currently being verified is indeed the person to whom the first biometric data item w belongs, then the control device 10 generates the cryptographic key K according to an embodiment of the invention, according to the following equation:

$$K=H(w)$$

where H is the same cryptographic function, for example a hash function, as the one used in the enrollment phase to obtain the hashed form of the biometric data stored in the database 31.

This key K is then sent, or more generally used in a protocol which enables requesting a search concerning authentication or identification, preferably in a secure manner, to the database 31 in order to find out whether any of the data stored in said database correspond to it. Here, advantageously, the step of searching for a correspondence between the stored hashed biometric data and the data item received from the control device does not have the issues related to biometrics and more particularly to the fact that two captures of biometric data from the same person may be substantially different. This characteristic of biometrics greatly complicates certain comparisons between biometric data in a context of biometric identification or authentication of a person, particularly in a large database.

Here, because of the characteristics described above, the authentication and/or identification step therefore advantageously corresponds to a cryptographic step and not a biometric one. Such a method allows using biometric data for a control verification that provides a high level of security, while performing an identity control cryptographically, thus avoiding the problems related to such a control when it is purely biometric.

It should also be noted that the database only contains biometric data in cryptographically encrypted form, and therefore does not allow a potential attacker to retrieve personal data. Personal privacy is therefore protected.

Such a control system combines the level of security of a biometric verification with cryptographic methods for identity verification and authentication.

In addition, the key K corresponding to H(w) is easily renewable, because two different captures provide distinct biometric data, and revocable in case a fraudulent use is detected.

Figure 4:
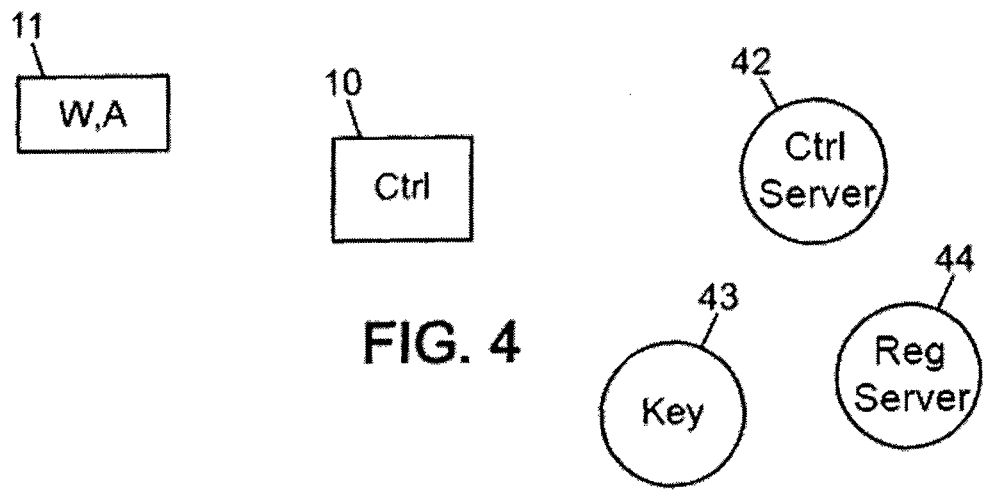
FIGS. 4 and 5 illustrate a group signature system according to one embodiment of the invention.

FIG. 4 illustrates a control system according to an embodiment of the invention in an application in the field of group signatures. In this application, the value K obtained based on a person's biometric data constitutes only a portion of a secret key of a signature group member in the group signature control system.

As an illustrative example, the following sections describe an application of the invention in the Boneh-Shacham group signature mechanism as described in the document "Group signatures with verifier-local revocation" by D. Boneh and H. Shacham, ACM Conference on Computer and Communications Security, 2004.

The control system adapted for a group signature method as illustrated in FIG. 4 comprises a control device 10, a control server 42, a registration server 44, a key management device 43 which holds a secret γ associated with the members of a signature group of the system, and a storage device 11.

The registration server is adapted to generate the second portion of the secret key and the control server is adapted to perform a control. It can easily be arranged to have the two servers colocated in a single server. A group signature method enables a group member to sign a message anonymously in the name of the group and thus allows proving membership in a group.

The value K, issuing from biometric data obtained according to an embodiment of the invention, can then advantageously be a portion of the private key used in a group signature method.

In this application, the intent is to determine whether or not the user associated with the portion K of the private key is a member of the signature group.

It should be noted that in an advantageous embodiment of the invention, membership in a group does not require management of a database. This characteristic is possible because of the use of a group secret γ associated with the members of the group considered.

Figure 5:
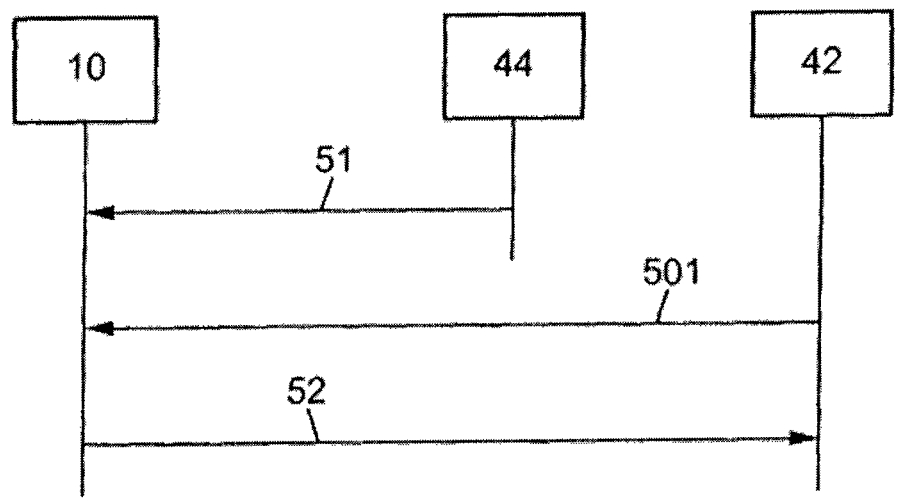

FIG. 5 illustrates a process for verifying membership in a signature group according to an embodiment of the invention.

During an enrollment phase I, a biometric data item w is captured. Then the registration server 44 in association with the key management device 43, which provides it the group secret γ associated with the user, determines a value A corresponding to the group secret γ and to said biometric data item w such that A satisfies the following equation (1):

$$A^{K+\gamma}=g_1 \qquad (1)$$

where $g_1$ is a public parameter of the system considered, and

K satisfies: K=H(w), where H is a cryptographic hash function.

Once the registration server 44 has determined this value A, it sends it towards the storage device 11 in a message 51. This sending can occur via the control device 10 which then allows the storage of the portion of the secret key A on the storage device 11, as illustrated in FIG. 5.

This value A is therefore stored on the storage device 11 of the user. Said storage device stores the data item (w, A) associated with the user.

Alternatively, the biometric data item w can be stored in the storage device 11 in a form transformed by the cryptographic function. In this case, here the complete secret cryptographic key is the pair (H(w), A). The example described below corresponds to this last case.

In such a system, a secret key (K, A) is associated with each member of the group in an enrollment phase, where K and A satisfy the equations listed above.

In this context, the user with his storage device 11 containing the secret key (K, A) must prove to the control server 42 that he knows a key satisfying the equation (1) in order to be recognized as a member of the group.

In a control phase II, the user presents his storage device 11 to the control device 10.

The control device 10 captures a second biometric data item w' concerning this user. It first attempts to compare the first and second biometric data items to each other in order to determine whether they come from the same person.

If the control device decides that these first and second data items come from the same person, the following steps of the process for verifying membership in a group can be carried out according to an embodiment of the invention.

FIG. 5 illustrates an enrollment phase I and a control phase II. During the control phase, the control device receives a message 501 indicating a message M (a challenge) from the control server 42.

To prove that he is a member of the group, the user signs the message M received from the control server on the basis in particular of his private key (K,A).

The following symbols are used:
$G_1$ is a cyclic multiplicative group of prime order p
$G_2$ is a multiplicative group of order equal to a power of p
$\psi$ is a homomorphism from the set $G_2$ to the set $G_1$
$g_2$ is an element of order p of $G_1$ and $g_1$ is a generating element of $G_1$ such that the following equation is satisfied:

$$\psi(g_2)=g_1$$

$G_T$ is a cyclic multiplicative group of prime order p
e is a non-degenerate matching from the set $G_1 \times G_2$ to the set $G_T$
H is a hash function from the set $\{0,1\}^*$ to Zp and H0 is another hash function establishing a correspondence of the set $\{0.9\}^*$ to the set $G_2^2$.

The symbol gpk denotes a group of public keys formed in the following manner:

$$gpk=(g_1,g_2,b)$$

where $b=g_2^\gamma$
where $\gamma$ is the secret associated with the group considered.

The private key (K, A) of the user considered is such that A is an element of $G_1$ and K is an element of $Z_p$.
K and A satisfy the following equation:

$$e(A,b.(g_2)^K)=e(g_1,g_2)$$

K being known, A can be determined on the basis of the secret $\gamma$ associated with the group.

The control device obtains:

$$(\hat{u},\hat{v})=H_0(gpk,M,r)$$

where r is a random value of Zp,
and $\hat{u}$ and $\hat{v}$ are generators of the group G2.
Then it obtains the values of u and v according to the following equations:

$$u=\psi(\hat{u}), \text{ and}$$

$$v=\psi(\hat{v})$$

Next it generates a random value $\alpha$ of $Z_p$ and calculates:

$$T_1=u^\alpha$$

$$T_2=A.v^\alpha$$

$$\delta=K\alpha$$

Based on random values $r_\alpha$; $r_K$; $r_\delta$ in the set $Z_p$, it determines the following values:

$$R_1=u^{r_\alpha}$$

$$R_2=e(T_2,g_2)^{r_K}e(v,w)^{-r_\alpha}e(v,g_2)^{-r_\delta}$$

$$R_3=T^{r_K}_{,}u^{-r_\delta}$$

The value satisfying the following equation is denoted c:

$$c=H(gpk,M,r,T_1,T_2,R_1,R_2,R_3)$$

Next the following are calculated:

$$s_\alpha=r_\alpha+c\alpha$$

$$s_K=r_K+cK$$

$$s_\delta=r_\delta+c\delta$$

The control device is then able to send to the control server the signed message $\sigma$ which satisfies the equation:

$$\sigma=(r,c,T_1,T_2,s_\alpha,s_K,s_\delta)$$

In such a context, on the control server side, the pair of values $(\hat{u},\hat{v})$ and their image u and v in the set $G_1$ can then be found.

To do this, the control server calculates:

$$\tilde{R}_1=u^{s_\alpha}/T_1^c$$

$$\tilde{R}_2=e(T_2,g_2)^{s_K}e(v,w)^{-s_\alpha}e(v,g_2)^{-s_\delta}(e(T_2,w)/e(g_1,g_2))^c$$

$$\tilde{R}_3=T_1^{s_K},u^{-s_\delta}$$

Then it checks that the following equation is satisfied:

$$c=H(gpk,M,r,T_1,T_2,\tilde{R}_1,\tilde{R}_2,\tilde{R}_3)$$

If such is the case, the control server accepts the signature.

Thus, using the cryptographic key K obtained from a biometric data item, in its capacity as a portion of the private key associated with a user of a group signature system, and by associating with it a group secret $\gamma$, it is possible to provide a reliable and effective group signature system without database management. These characteristics are based on the fact that the value A can easily be obtained from K and from the group secret $\gamma$.

A key is easily renewable in such a context, because two different captures provide distinct biometric data, which are also easily revocable. A revocation process can be provided as is now described. Let A be a member of a current revocation list. It can then be verified that the following equation is satisfied:

$$e(T_2/A,\hat{u})=e(T_1,\hat{v})$$

If this equation is satisfied, then the revocation is performed.

In addition, the secret key can be managed such that the key is valid for a limited period, thus regularly resetting the revocation list.

Figure 6:
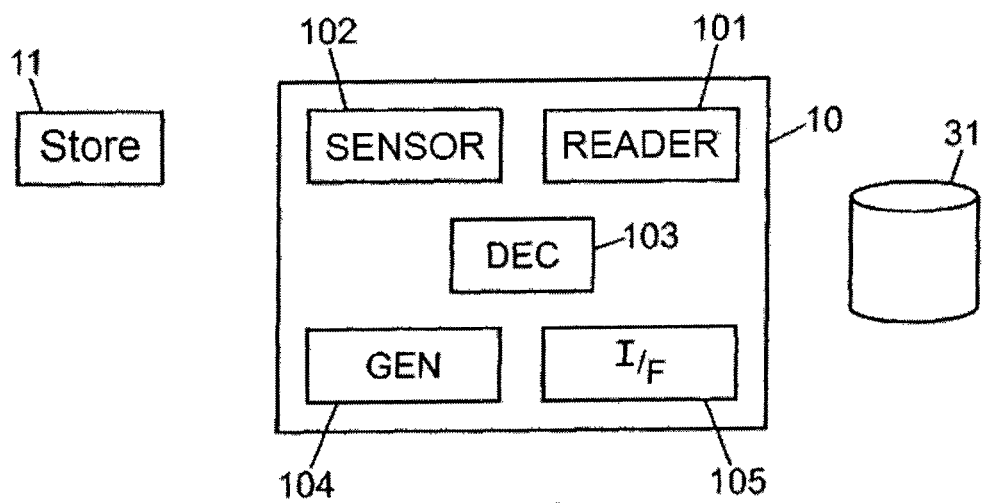
FIGS. 6 and 7 illustrate a control system according to two embodiments of the invention.

FIG. 6 illustrates a control system comprising:
a storage device 11 on which a first biometric data item w is stored
a biometric data sensor 102 adapted to capture a second biometric data item w'
a biometric data storage device reader 101 a control device 10 comprising:
- a decision unit 103 adapted to decide whether the first and second biometric data items correspond to each other on the basis of a comparison between the first and the second biometric data items; and
- a secret cryptographic key generation unit 104 adapted to generate at least a portion of a secret cryptographic key K by applying a cryptographic function H to the first biometric data item, when the decision unit has decided that the first w and second w' biometric data items correspond to each other.

No limitation is placed on the architecture concerning the sensor, reader, control device, and storage device.

It should also be noted that it is possible for the storage device, the sensor, and therefore the reader to be colocated.

Alternatively, the sensor and reader can easily be separate from the storage device and the control device, and the storage device can easily be colocated with the control device. In this case, the storage device is a Match on Card (MoC) type of device.

This control system can additionally comprise:
- a database 31 storing biometric data in a form transformed by the cryptographic function H(w).

The control device 10 then additionally comprises an interface unit adapted to request from the database a verification of the secret cryptographic key generated by the generation unit 104.

Figure 7:
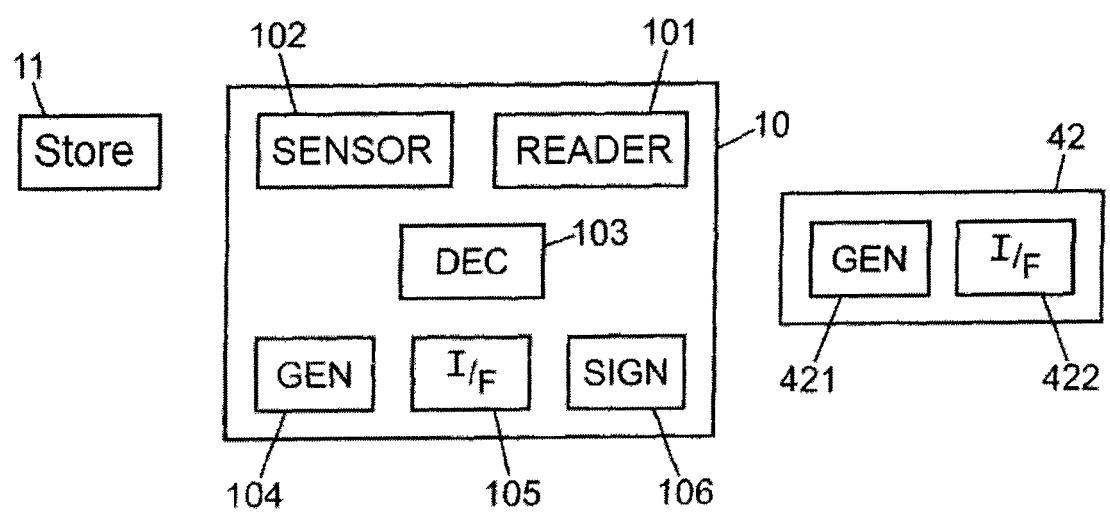

FIG. 7 illustrates another control system, additionally comprising a control sever 42 adapted to verify membership in a group of members able to do a group signature, a group secret being associated with this group, wherein the control device 10 additionally comprises:
- an interface unit 105 interfacing with the control server 42, adapted to receive 501 a message M and to send a signed message; and
- a signature unit 106 adapted to generate a signed message from a received message M on the basis of a secret cryptographic key comprising the secret cryptographic key portion K generated by the control device and another secret cryptographic key portion A generated by the registration server 44 on the basis of the group secret and said secret cryptographic key portion.

The registration server 44 can comprise:
- a generation unit 421 for generating another secret cryptographic key portion A according to the following equation:

$$A = g_1^{1/K+\gamma}$$

where K is the secret cryptographic key portion generated by the generation unit 104 of the control device, γ is the group secret, and $g_1$ is a public parameter of the control system,
- an interface unit 422 adapted to send said other secret cryptographic key portion to the storage device 11.

The invention claimed is:

1. A control process in a control system comprising a control device adapted to receive a signal indicating a first biometric data item (w) and to obtain a second captured biometric data item (w'), said process comprising the following steps at the control device:
/a/ comparing the first and second biometric data items,
/b/ deciding that the first and second biometric data items correspond to each other on the basis of step /a/, and
/c/ generating at least a portion (K) of a secret cryptographic key (H(w)) by applying a cryptographic function (H) to the first biometric data item, wherein a group secret (γ) is associated with members of a group, each of the members being able to do a group signature;

said process additionally comprising the following steps at the control device:
/i/ receiving a message (M),
/ii/ signing the message on the basis of the secret cryptographic key (H(w)) comprising the secret cryptographic key portion (K) generated in step /c/ and another secret cryptographic key portion (A), wherein the another secret cryptographic key portion (A) satisfies the following equation:

$$A = g_1^{1/(K+\gamma)}$$

where $g_1$ is a public parameter of the control system, and
/iii/ sending the signed message (σ) in response to step /i/.

2. The control process according to claim 1, wherein the signal indicating the first biometric data item (w) comes from a storage device on which said first biometric data item (w) is stored.

3. The control process according to claim 1, wherein a complete secret cryptographic key (K) is generated in step /c/, the cryptographic system additionally comprising a database storing at least said secret cryptographic key in a form transformed by the cryptographic function;

said process additionally comprising the following steps at the control device:
/d/ sending a control request based on the secret cryptographic key, and
/e/ receiving a control response indicating whether the secret cryptographic key is stored in the database.

4. The control process according to claim 1, wherein the control system comprises a registration server, said control process additionally comprising the following steps at the control device, before step /i/:
receiving the other secret cryptographic key portion (A) from the registration server, and
storing said other secret cryptographic key portion on a storage device.

5. A control process in a control system comprising: a storage device adapted to store a first biometric data item (w), and a registration server;

wherein a group secret (γ) is associated with members of a group, each of the members being able to do a group signature;

said process comprising the following steps, at the registration server:
/a/ obtaining a first secret cryptographic key portion (K) by applying a cryptographic function (H) to the first biometric data item (w),
/b/ generating a second secret cryptographic key portion A according to the following equation:

$$A = g_1^{1/(K+\gamma)}$$

where K is the first secret cryptographic key portion, γ is the group secret, and
$g_1$ is a public parameter of the control system,
/c/ transmitting the second secret cryptographic key portion towards the storage device.

6. A control system comprising:
a storage device on which a first biometric data item (w) is stored,
a biometric data sensor adapted to capture a second biometric data item (w'),
a biometric data storage device reader, and a control device comprising:
- a decision unit adapted to decide whether the first (w) and second (w') biometric data items correspond to each other on the basis of a comparison between the first (w) and second (w') biometric data items, and
- a secret cryptographic key generation unit adapted to generate at least a portion of a secret cryptographic key (K) by applying a cryptographic key function (H) to the first (w) biometric data item, when the decision unit has decided that the first (w) and second (w') biometric data items correspond to each other, the control system comprising a control server adapted to verify membership in a group of members able to do a group signature, a group secret being associated with the group, the control device additionally comprising:
- an interface unit interfacing with the control server, adapted to receive a message (M) and to send a signed message, and
- a signature unit adapted to generate a signed message from the received message (M) on the basis of a secret cryptographic key comprising the secret cryptographic key portion (K) generated by the control device and another secret cryptographic key portion (A) generated by a registration server on the basis of the group secret and said secret cryptographic key portion.

7. The control system according to claim 6, additionally comprising:
- a database storing biometric data in a form transformed by the hashed cryptographic function (H(w));
- wherein the control device additionally comprises another interface unit adapted to request from the database a verification of the secret cryptographic key generated by the secret cryptographic key generation unit.

8. The control system according to claim 6, additionally comprising another registration server which comprises:
- a generation unit for generating another secret cryptographic key portion (A) according to the following equation:

$$A = g_1^{1/(K+\gamma)}$$

where K is the secret cryptographic key portion generated by the secret cryptographic key generation unit of the control device,
γ is the group secret, and
$g_1$ is a public parameter of the control system,
another interface unit adapted to send said other secret cryptographic key portion to the storage device.

* * * * *